United States Patent
Dropps

(10) Patent No.: US 10,642,683 B2
(45) Date of Patent: May 5, 2020

(54) INNER AND OUTER CODE GENERATOR FOR VOLATILE MEMORY

(71) Applicant: HEWLETT PACKARD ENTERPRISE DEVELOPMENT LP, Houston, TX (US)

(72) Inventor: Frank R. Dropps, Eagan, MN (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 192 days.

(21) Appl. No.: 15/729,891

(22) Filed: Oct. 11, 2017

(65) Prior Publication Data
US 2019/0108147 A1    Apr. 11, 2019

(51) Int. Cl.
| | |
|---|---|
| *G06F 11/00* | (2006.01) |
| *G06F 11/10* | (2006.01) |
| *G06F 13/16* | (2006.01) |
| *G06F 8/30* | (2018.01) |
| *G06F 12/02* | (2006.01) |
| *G06F 11/07* | (2006.01) |
| *G06F 8/65* | (2018.01) |

(52) U.S. Cl.
CPC ............ *G06F 11/1004* (2013.01); *G06F 8/37* (2013.01); *G06F 8/65* (2013.01); *G06F 11/073* (2013.01); *G06F 11/10* (2013.01); *G06F 11/102* (2013.01); *G06F 11/106* (2013.01); *G06F 11/1012* (2013.01); *G06F 11/1056* (2013.01); *G06F 12/0238* (2013.01); *G06F 13/1694* (2013.01)

(58) Field of Classification Search
CPC .... G06F 11/073; G06F 11/10; G06F 11/1004; G06F 11/102; G06F 11/1056; G06F 11/106; G06F 13/1694; G06F 8/37; G06F 12/0238; G06F 11/1012; G06F 8/65
See application file for complete search history.

(56) References Cited

U.S. PATENT DOCUMENTS

| | | | |
|---|---|---|---|
| 8,245,111 B2 | 8/2012 | Chishti et al. | |
| 8,572,457 B2 | 10/2013 | Rub et al. | |
| 8,640,005 B2 | 1/2014 | Wilkerson et al. | |
| 9,015,549 B2 | 4/2015 | Rub et al. | |
| 9,559,725 B1 | 1/2017 | Shao et al. | |
| 9,582,359 B2 | 2/2017 | Alhussien et al. | |
| 2006/0256615 A1* | 11/2006 | Larson | G06F 11/106 365/185.09 |
| 2008/0052598 A1 | 2/2008 | Aksamit et al. | |
| 2011/0296272 A1 | 12/2011 | Rub et al. | |

(Continued)

OTHER PUBLICATIONS

Neuberger, G. et al., "A Multiple Bit Upset Tolerant SRAM Memory," (Research Paper), Jan. 17, 2003, 6 pages, http://www.inf.ufrgs.br/~fglima/neuberger_latw03.pdf.

*Primary Examiner* — Joseph D Manoskey
(74) *Attorney, Agent, or Firm* — Hewlett Packard Enterprise Patent Department

(57) ABSTRACT

A system includes a volatile memory to store data and a memory controller to manage the data in the volatile memory. The memory controller includes an inner code generator to generate a respective inner correction code for each of a plurality of blocks of the data in the volatile memory. An outer code generator generates an outer correction code based on the plurality of blocks of the data. The memory controller updates the outer correction code as part of a refresh to the plurality of blocks of the data in the volatile memory.

16 Claims, 4 Drawing Sheets

(56) References Cited

U.S. PATENT DOCUMENTS

| | | | |
|---|---|---|---|
| 2012/0233498 A1* | 9/2012 | Ramaraju | G06F 11/1064 |
| | | | 714/23 |
| 2016/0134307 A1* | 5/2016 | Hu | G11C 29/52 |
| | | | 714/758 |
| 2016/0173128 A1* | 6/2016 | Ware | H03M 13/05 |
| | | | 714/768 |
| 2017/0093438 A1 | 3/2017 | Motwani | |
| 2017/0161143 A1* | 6/2017 | Reed | G06F 11/1068 |
| 2017/0269979 A1* | 9/2017 | Gollub | G06F 11/076 |
| 2018/0175885 A1* | 6/2018 | Hanham | H03M 13/1108 |

* cited by examiner

INNER AND OUTER CODE GENERATOR FOR VOLATILE MEMORY

BACKGROUND

A memory controller is a digital circuit that manages the flow of data going to and from the processor's main memory. The memory controller can be a separate chip or integrated into another chip such as being placed on the same die or as an integral part of a microprocessor. Memory controllers can include logic to read and write to dynamic random access memory (DRAM), and to "refresh" the DRAM. Without persistent refreshes, the DRAM will lose data written to it as the respective capacitors forming memory elements in the DRAM leak their charge within a fraction of a second. Reading and writing to DRAM can be performed by selecting row and column data addresses of the DRAM as the inputs to a multiplexer circuit, where a demultiplexer on the DRAM uses the converted inputs to select the correct memory location and return stored data.

DETAILED DESCRIPTION

Systems and methods can detect and correct multiple bits errors. For example, multi-level correction codes are generated and stored for a given block of data in the volatile memory that enables the system to both detect and correct multiple bit errors from the block. An inner correction code is generated based on the block of data to detect and correct single-bit errors within the block. The block of data can include one or more lines of data, each of which lines can include an inner correction code. The block of data, including the inner correction code, is processed to generate an outer correction code for the block, which is employed to correct multiple bit errors for the block.

As a further example, a system includes a memory controller to manage the data in the volatile memory. The memory controller includes an inner code generator to generate an inner correction code based on a block of the data (e.g., 64-bits or double word) in the volatile memory. For example, the inner correction code can be an error checking and correction code (ECC) that is stored within the block of data to correct single bit errors in the block. The memory controller also includes an outer code generator to generate an outer correction code based on the block of data, where the previously processed block (or blocks) having single correction codes, are collectively reprocessed to generate the outer correction code. In some examples, the outer correction code can be generated using various coding techniques, such as including a parity code, a Cycle Redundancy Check (CRC) code, a Hamming code, a Bose-Chaudhuri-Hocquenghem (BCH) code, a low density parity check (LDPC) code, or a Reed-Solomon code. The memory controller updates the inner correction code and the outer correction code as part of a refresh cycle for the data in the volatile memory. The memory controller can also include a memory scrubber to operate, as in a background process, to correct single bit errors in the block of data via the inner correction code and to correct multiple bit errors in the block of data via the outer correction code. The memory scrubber could also update the outer codes when a flag indicates a partial block write occurred and the outer correction code is not valid.

Figure 1:
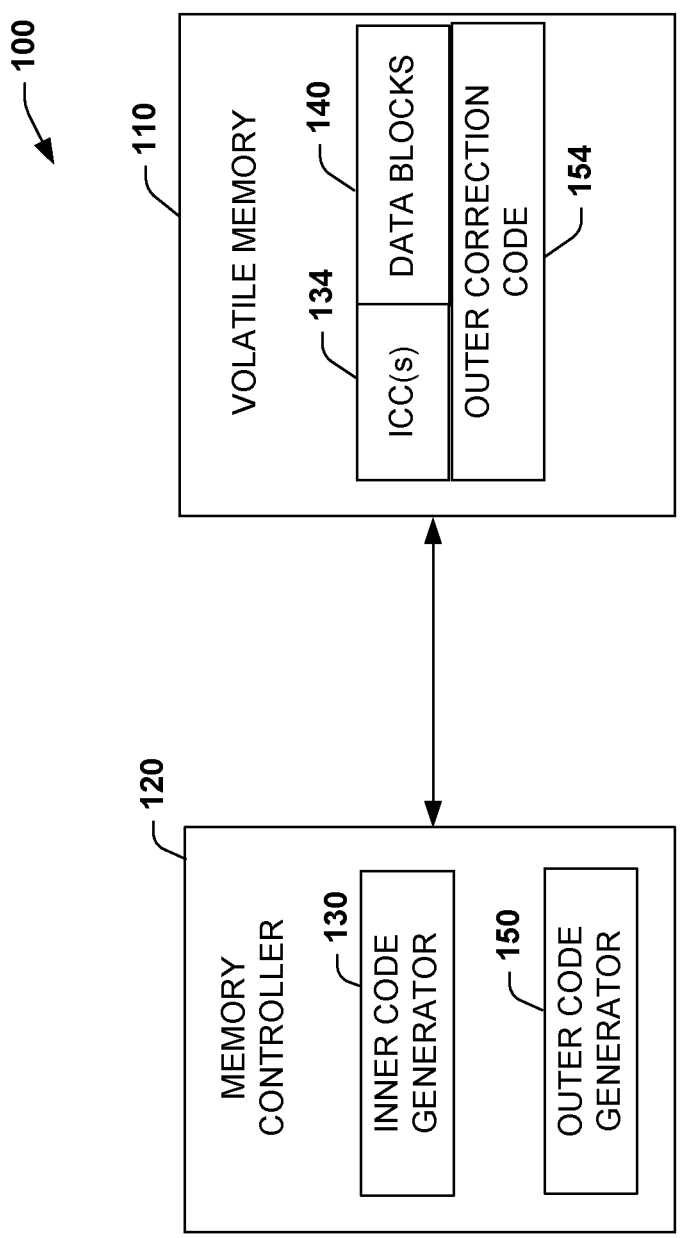
FIG. 1 illustrates an example system to generate inner and outer correction codes to facilitate correction of multiple bit errors in a volatile memory.

FIG. 1 illustrates an example system 100 to generate inner and outer correction codes to facilitate correction of multiple bit errors in a volatile memory. The system 100 includes a volatile memory 110 to store data and a memory controller 120 to manage the data in the volatile memory. The memory controller 120 includes an inner code generator 130 to generate a respective inner correction code 134 (or codes) for each of a plurality of blocks of the data 140 in the volatile memory 110. An outer code generator 150 generates an outer correction code 154 based on the plurality of blocks of the data 140, wherein the memory controller 120 updates the outer correction code as part of a refresh to the plurality of blocks of the data in the volatile memory 110. As used herein, memory refresh refers to the process of periodically reading information (e.g., one or more blocks of data, such as a cache line) from an area of computer memory and immediately rewriting the read information to the same area without modification, for the purpose of preserving the information.

The memory controller 120 in addition to performing refresh also can initiate generating the inner correction code 134 and/or outer correction code as part of the refresh process (e.g., before, during, or after the refresh). In an example, the volatile memory 110 can be a dynamic random access memory (DRAM). In addition to updating the inner code 134 and outer code 154, the memory controller 120 can also include a memory scrubber (see e.g., FIG. 2) to correct single bit errors via the inner correction code 134 in the block of the data 140. The memory scrubber can also correct multiple bit errors via the outer correction code 154 in the plurality of blocks of the data 140.

The plurality of the blocks of the data 140 can include one or more memory locations of a specified length. For example, the memory controller 120 can specify a length N of bytes for the plurality of the blocks of the data 140. If the memory controller 120 updates all N bytes for the block of data 140, the inner correction code(s) 134 can be updated for the N bytes and the outer correction code 154 can be updated based on the updates to the N bytes, where N is a positive integer. If the memory controller 120 updates less than the length N of bytes specified for the plurality of the blocks of the data 140, a flag can be set indicating the outer correction code 154 is invalid, where the memory scrubber monitors the flag and updates the outer correction code based on the partial write initiated to the block of data. Also, the outer code generator 150 can update the outer correction code 154 and the memory scrubber resets the flag to valid after the length of N bytes has been updated or read by the memory controller 120.

In one example, the memory controller 120 processes the block of data 140 and generates error checking and correction codes (ECCs) as the inner correction code(s) 134 for each block of the data 140. In another example, the outer code generator 150 processes plurality of the blocks of the"

data 140 and generates a parity code, a Cycle Redundancy Check (CRC) code, a Hamming code, a Bose-Chaudhuri-Hocquenghem (BCH) code, a low density parity check (LDPC) code, or a Reed-Solomon code as the outer correction code 154. Furthermore, the inner code generator 130 can generate an ECC code for the outer correction code 154 to facilitate error correction of the outer correction code (see e.g., FIG. 3). The memory controller 120 can be a cache memory controller that controls memory updates and refresh to the volatile memory, where the plurality of the data blocks 140 form a respective cache line of the volatile memory.

The memory controller 120 can include various examples of refresh circuitry to refresh the data. The refresh circuitry may include a refresh counter that contains the address of the row to be refreshed which is applied to the chip's row address lines, and a timer that increments the counter to step through the rows. The counter may be part of the memory controller 120, or on the memory chip itself. In one example, the refresh circuitry implements a burst refresh strategy that includes a series of refresh cycles that can be performed one after another until all the rows have been refreshed, after which normal memory accesses occur until the next refresh is to be performed. As another example, the refresh circuitry implements a distributed refresh strategy that operates to refresh the memory at regular intervals, interspersed with memory accesses.

Figure 2:
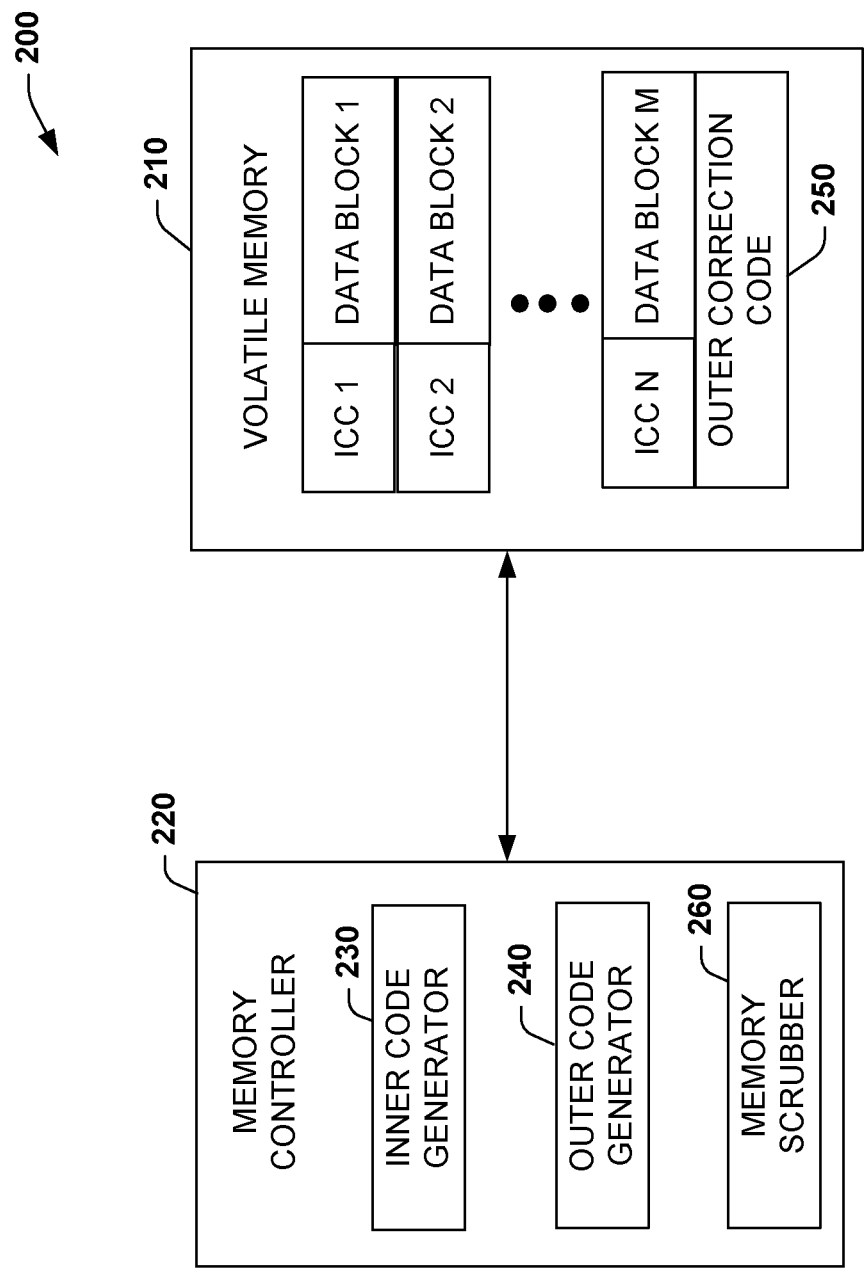
FIG. 2 illustrates an example system to generate inner and outer correction codes where a memory scrubber can correct multiple bit errors in a volatile memory based on the correction codes.

FIG. 2 illustrates an example system 200 to generate inner and outer correction codes where a memory scrubber can correct multiple bit errors in a volatile memory based on the correction codes. The system 200 includes a volatile memory 210 to store data. A memory controller 220 refreshes the data in the volatile memory 210. The memory controller 220 includes an inner code generator 230 to generate a plurality of inner correction codes shown as ICC codes 1 though N based on a plurality of data blocks 1 though M in the volatile memory 210, where N and M are positive integers. Each of the plurality of data blocks 1 though M is assigned to a separate one of the plurality of correction codes 1 through N.

An outer code generator 240 generates an outer correction code 250 based on collectively processing the plurality of data blocks 1 through M. The memory controller updates the inner correction code 1 though N and the outer correction code 250 during the refresh to the data in the volatile memory 210. A memory scrubber 260 corrects single bit errors via the inner correction code 1 though N in the plurality of data blocks 1 though M and corrects multiple bit errors via the outer correction code 250 in the plurality of data blocks. As described previously, the memory scrubber can monitor a flag indicating a partial memory write has occurred to a subset of the data blocks 1 though M and update the outer correction code 250 based on the partial memory write. The memory scrubber 260 can operate in the background of normal refresh operations of the memory controller 220.

The outer correction code 250 can be stored with cache line data (in a cache memory example) or in another location. This data may be stored on the volatile memory (e.g., DRAM) and may not be normally be visible until it is read to correct an error. The outer correction code can be generated using any number of algorithms such as parity codes, a Cycle Redundancy Check (CRC) codes, Hamming codes, BCH codes, Reed-Solomon codes, low-density parity-check (LDPC) codes or other error correction code. The outer correction code 250 can also be generated somewhere along the path between the volatile memory 210 and the memory controller 220. In an example, the outer correction code 250 can be generated by hardware from the processing of a cache line (or other designated memory block).

In another example, the outer correction code 250 can be generated when a full cache line is written back to the volatile memory 210. In another example, the outer correction code 250 can be updated when partial cache line writes are performed. For instance, a flag can be set by the memory controller 220 indicating when the outer correction code 250 is valid or not valid. The memory scrubber 260 can update the outer correction code 250 when partial cache line writes occurred and repair single bit errors or multi-bit errors that are detected. The memory scrubber 260 can also be incorporated as part of the DRAM refresh process.

The outer correction code 250 can be written with cache line data, but in one example is read if there is an uncorrectable error in the cache line memory data that is read. If an uncorrectable error (e.g., multi-bit error) is detected along the path to memory controller 220, the outer correction code 250 can be read and the cache line data corrected. In an example, the complete correction process can occur within a dual in-line memory module (DIMM) or along the path where volatile data is stored. The outer correction code 250 should have little impact on read latency to the volatile memory 210 as the outer correction code should only be read when an uncorrectable error was detected. In another example, the outer correction code 250 can be used to check the integrity of the data if any of the data within the covered block is read.

Figure 3:
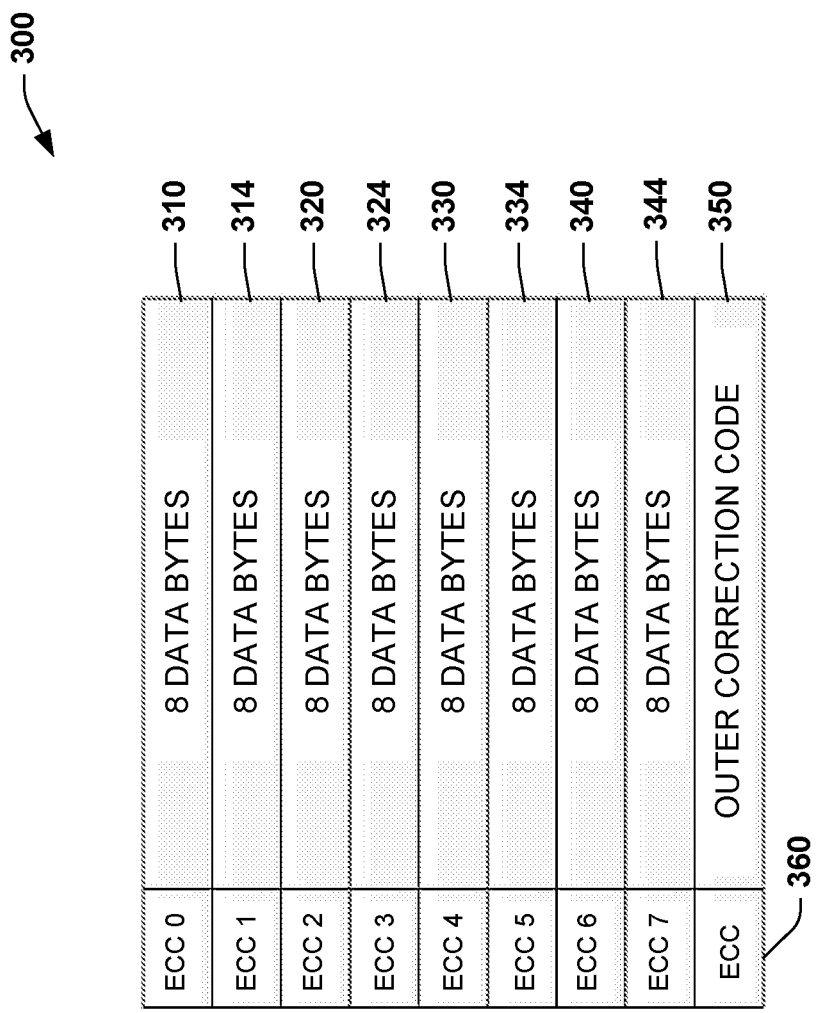
FIG. 3 illustrates an example of a volatile memory having multiple data blocks where inner and outer correction codes are stored to facilitate correcting multiple bit errors in the data blocks.

FIG. 3 illustrates an example of a volatile memory 300 having multiple data blocks where inner and outer correction codes are stored to facilitate correcting multiple bit errors in the data blocks. The volatile memory 300 can be implemented as a cache line in this example but substantially any volatile memory implementation is possible. In this example, the cache line includes eight data blocks 310, 314, 320, 324, 330, 334, 340, 34. More or less than eight data blocks can be employed. Each of the data blocks 310 through 344 holds eight data bytes in this example, however more or less than eight data bytes can be specified for a respective data block. Thus, in this example, the cache line includes 64 bytes having eight rows of eight bytes. As shown, each of the eight data bytes for a given data block has an ECC computed and stored which are shown as ECC bits 0 though 7 which are associated with bytes 310 through 344, respectively. The ECC bits ECC 0 through 7 are utilized to correct single bit errors in the respective data blocks 310 through 344.

An outer correction code 350 is stored that is employed to correct multiple bit errors detected within the data blocks 310 through 344. Multiple errors can be detected within a given data block 310 through 344 or detected between data blocks where one error is detected in one block and another error is detected in another data block. An ECC 360 can also be generated for the outer correction code 350 to allow for error correction of the outer code. In another aspect, the outer correction code 350 also protects and allows for the correction of errors within the outer code. As described previously, the memory controller described herein includes an outer code generator to generate the outer correction code 350 based on the blocks of data 310 through 344, where the previously processed blocks having single correction codes ECC0 through 7, are collectively processed to generate the outer correction code.

In some examples, the outer correction code 350 can be generated by processing the data blocks 310 through 344 using various coding techniques, such as including a parity code, a Cycle Redundancy Check (CRC) code, a Hamming code, a Bose-Chaudhuri-Hocquenghem (BCH) code, a low density parity check (LDPC) code, or a Reed-Solomon code. The memory controller described herein can update the inner correction codes ECC 0 though 7 and the outer correction code 350 as part of a refresh cycle for the data in the volatile memory 300. The memory controller can also include a memory scrubber to operate, as in a background process, to correct single bit errors in the block of data via the inner correction code ECC 0 though 7, to correct multiple bit errors in the block of data 310 through 344 via the outer correction code 350 and to make the outer correction code valid after part of the data block has been updated.

Figure 4:
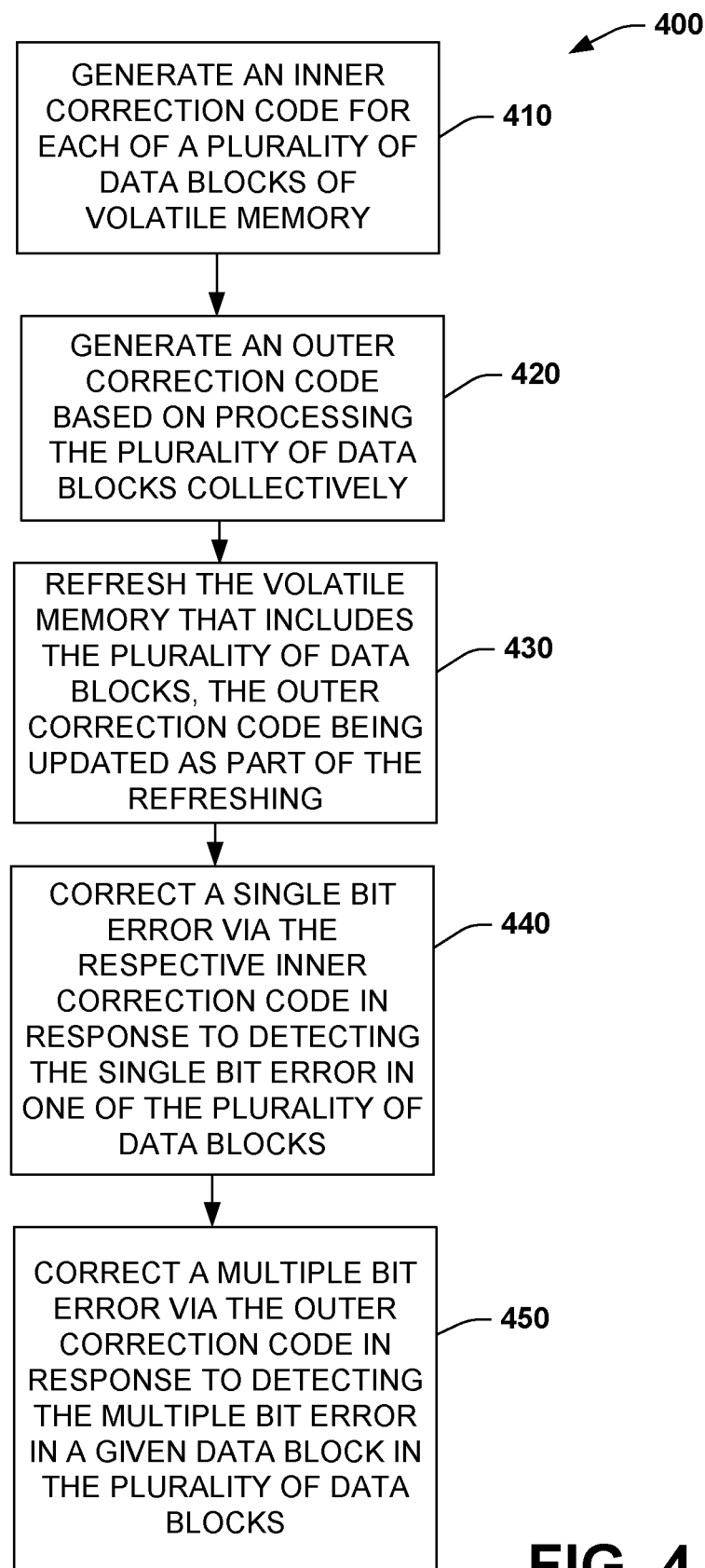
FIG. 4 illustrates an example method to generate inner and outer correction codes to facilitate correction of multiple bit errors in a volatile memory.

In view of the foregoing structural and functional features described above, an example method will be better appreciated with reference to FIG. 4. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured as machine readable instructions stored in memory and executable in an integrated circuit, controller, or a processor, for example.

FIG. 4 illustrates an example method 400 to generate inner and outer correction codes to facilitate correction of multiple bit errors in a volatile memory. At 410, the method 400 includes generating an inner correction code for each of a plurality of data blocks of volatile memory (e.g., via inner code generator 130 of FIG. 1 and 230 of FIG. 2). At 420, the method 400 includes generating an outer correction code based on processing the plurality of data blocks collectively (e.g., via outer code generator 150 of FIG. 1 and 240 of FIG. 2). At 430, the method includes refreshing the volatile memory that includes the plurality of data blocks, the outer correction code being updated as part of the refreshing (e.g., via memory controller 120 of FIG. 1 and 220 of FIG. 2). At 440, the method 400 includes correcting a single bit error via the respective inner correction code in response to detecting the single bit error in one of the plurality of data blocks (e.g., via memory scrubber 260 of FIG. 2).

At 450, the method 400 includes correcting a multiple bit error via the outer correction code in response to detecting the multiple bit error in a given data block in the plurality of data blocks (e.g., via memory scrubber 260 of FIG. 2). Although not shown, the method 400 can also include specifying a length N of bytes for the block of data, updating all N bytes for the block of data, and updating the inner correction code for the N bytes and the outer correction code based on the updating to the N bytes, where N is a positive integer. The method 400 can also include updating less than the length N of bytes specified for the block of data and setting a flag indicating that a partial write has been initiated to the block of data and that the outer correction code is invalid. The method 400 can also include updating the outer correction code and resetting the flag to valid after the length of N bytes has been updated or read and a valid outer correction code determined.

What have been described above are examples. One of ordinary skill in the art will recognize that many further combinations and permutations are possible. Accordingly, this disclosure is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system, comprising:
   a volatile memory to store data;
   a memory controller to manage the data in the volatile memory, the memory controller comprising:
      an inner code generator to generate a respective inner correction code for each of a plurality of blocks of the data in the volatile memory;
      an outer code generator to generate an outer correction code based on the plurality of blocks of the data, wherein the memory controller updates the outer correction code as part of a refresh to the plurality of blocks of the data in the volatile memory; and
      a memory scrubber to correct single bit errors via the inner correction code in the plurality of blocks of the data and to correct multiple bit errors via the outer correction code in the plurality of blocks of the data; and
   wherein the memory controller specifies a length N of bytes for the plurality of blocks of the data, if the memory controller updates all N bytes for the plurality of blocks of the data, the inner correction code is updated for the N bytes and the outer correction code is updated based on the updates to the N bytes, N being a positive integer, the inner correction code and the outer correction code being updated as part of the refresh to the data.

2. The system of claim 1, wherein if the memory controller updates less than the length N of bytes specified for the plurality of blocks of data, a flag is set indicating the outer correction code is invalid and the memory scrubber monitors the flag and updates the outer correction code based on the partial write initiated to the plurality of blocks of the data.

3. The system of claim 2, wherein the outer code generator updates the outer correction code and the memory scrubber resets the flag to valid after the length of N bytes has been updated or read by the memory controller.

4. The system of claim 1, wherein the inner code generator processes the plurality of blocks of the data and generates an error checking and correction code (ECC) as the inner correction code for each block of the data.

5. The system of claim 4, wherein the outer code generator processes the block of data and generates a parity code, a Cycle Redundancy Check (CRC) code, a Hamming code, a Bose-Chaudhuri-Hocquenghem (BCH) code, a low density parity check (LDPC) code, or a Reed-Solomon code as the outer correction code.

6. The system of claim 4, wherein the inner code generator generates the ECC for the outer correction code to facilitate error correction of the outer correction code.

7. The system of claim 6, wherein the memory controller is a cache memory controller that controls memory updates and refresh to the volatile memory, and wherein the plurality of blocks of the data form a respective cache line of the volatile memory.

8. The system of claim 7, wherein the volatile memory is a dynamic random access memory (DRAM).

9. A method, comprising:
   generating an inner correction code for each of a plurality of data blocks of volatile memory;

generating an outer correction code based on processing the plurality of data blocks collectively;

refreshing the volatile memory that includes the plurality of data blocks, the outer correction code being updated as part of the refreshing;

correcting a single bit error via the respective inner correction code in response to detecting the single bit error in one of the plurality of data blocks;

correcting a multiple bit error via the outer correction code in response to detecting the multiple bit error in a given data block in the plurality of data blocks;

specifying a length N of bytes for the block of data, N being a positive integer;

updating all N bytes for the block of data;

updating the inner correction code for the N bytes and the outer correction code based on the updating to the N bytes;

updating less than the length N of bytes specified for the block of data; and setting a flag indicating that a partial write has been initiated to update the block of data and that the outer correction code is invalid.

10. The method of claim 9, further comprising:

updating the outer correction code and resetting the flag to valid after the length of N bytes has been updated or read.

11. A system, comprising:

a volatile memory to store data; and a memory controller to manage the data in the volatile memory, the memory controller comprising:

an inner code generator to generate a plurality of inner correction codes based on data values in each of a plurality of data blocks in the volatile memory, wherein each of the plurality of inner correction codes is assigned to correct a respective one of the plurality of data blocks;

an outer code generator to generate an outer correction code based on processing the plurality of data blocks collectively, wherein the memory controller updates at least one of the inner correction code and the outer correction code during a refresh to the plurality of data blocks in the volatile memory; and a memory scrubber to correct single bit errors in a given one of the plurality of data blocks via its respective inner correction code and to correct multiple bit errors in the plurality data blocks via the outer correction code; and wherein the memory scrubber monitors a flag indicating a partial memory write has occurred to a subset of the data blocks and the outer code generator updates the outer correction code based on the partial memory write.

12. A system, comprising:

a volatile memory to store data; and a memory controller to manage the data in the volatile memory, the memory controller comprising:

an inner code generator to generate a respective inner correction code for each of a plurality of blocks of the data in the volatile memory; and an outer code generator to generate an outer correction code based on the plurality of blocks of the data, wherein the memory controller updates the outer correction code as part of a refresh to the plurality of blocks of the data in the volatile memory; and wherein:

the inner code generator processes the plurality of blocks of the data and generates an error checking and correction code (ECC) as the inner correction code for each block of the data; and the inner code generator generates the ECC for the outer correction code to facilitate error correction of the outer correction code.

13. The system of claim 12, wherein the memory controller further comprises a memory scrubber to correct single bit errors via the inner correction code in the plurality of blocks of the data and to correct multiple bit errors via the outer correction code in the plurality of blocks of the data.

14. The system of claim 13, wherein if the memory controller updates less than a length N of bytes specified for the plurality of blocks of data, a flag is set indicating the outer correction code is invalid and the memory scrubber monitors the flag and updates the outer correction code based on the partial write initiated to the plurality of blocks of the data.

15. The system of claim 14, wherein the outer code generator updates the outer correction code and the memory scrubber resets the flag to valid after the length of N bytes has been updated or read by the memory controller.

16. The system of claim 12, wherein the outer code generator processes the block of data and generates a parity code, a Cycle Redundancy Check (CRC) code, a Hamming code, a Bose-Chaudhuri-Hocquenghem (BCH) code, a low density parity check (LDPC) code, or a Reed-Solomon code as the outer correction code.

* * * * *